United States Patent [19]

Langdon

[11] 4,178,434

[45] Dec. 11, 1979

[54] AMINE-COUPLED POLYEPICHLOROHYDRIN AND POLYAMINES DERIVED THEREFROM

[75] Inventor: William K. Langdon, Grosse Ile, Mich.

[73] Assignee: BASF Wyandotte Corporation, Wyandotte, Mich.

[21] Appl. No.: 866,207

[22] Filed: Jan. 3, 1978

[51] Int. Cl.$^2$ .................. C08G 65/32; C08G 65/26
[52] U.S. Cl. .................. 528/405; 260/584 B
[58] Field of Search ............... 260/2 BP, 2 A, 584 B, 260/584; 528/405

[56] References Cited

U.S. PATENT DOCUMENTS

| | | | |
|---|---|---|---|
| 3,251,852 | 5/1966 | De Groote et al. | 260/309.6 |
| 3,331,788 | 7/1967 | Lorensen et al. | 260/2 |
| 3,746,678 | 7/1973 | Dick et al. | 260/2 A |
| 3,753,931 | 8/1973 | Raspanti | 260/2 BP |
| 4,056,510 | 11/1977 | Symm et al. | 260/47 EP |

*Primary Examiner*—Earl A. Nielsen
*Attorney, Agent, or Firm*—Joseph D. Michaels; Arnold S. Weintraub

[57] ABSTRACT

Highly functional, substantially linear, polyamines are prepared by reacting a primary amine with an epihalohydrin oligomer or a mixture of an epihalohydrin oligomer and a halohydrin-terminated derivative of a polyol. Displacement of the haloalkyl halogen groups of the polyamine with amine groups provides highly functional amine intermediates which are useful in the preparation of drainage aids and the like.

13 Claims, No Drawings

AMINE-COUPLED POLYEPICHLOROHYDRIN AND POLYAMINES DERIVED THEREFROM

BACKGROUND OF THE INVENTION

1. Field of the Invention

The present invention pertains to amine compounds. More particularly, the present invention concerns polymeric polyamines derived from epihalohydrins and primary amines. Even more particularly, the present invention concerns polyamines derived from epihalohydrins and primary amines and derivatives thereof, such as highly functional polyamine derivatives thereof.

2. Prior Art

There has been developed a wealth of art relative to the formation of polyamines. Within the art, there has been documented the reaction of amines with epihalohydrin polymers and, especially, those from epichlorohydrin. Such products are traditionally divulged as being used in the manufacture of paper.

As will be appreciated from a review of the prior art, the reaction normally comprises the deployment of a polyamine and monomeric epihalohydrin or an epihalohydrin polymer.

Because of the plurality of uses of polyamines, the art has consistently attempted to produce new, economical compounds which enhance the end products produced from the polyamines by virtue of the distinct structure associated with the polyamines, per se.

As will subsequently be detailed, the present invention provides new polyamines.

STATEMENT OF RELEVANT ART

To the best of applicant's knowledge, the most relevant art is found in the following patents:

U.S. Pat. Nos. 2,753,372; 3,031,505; 3,864,288; 3,655,506; 3,313,742; 3,607,792; 3,310,504; 3,951,888; 2,174,762.

SUMMARY OF THE INVENTION

In accordance with the present invention there are provided new polyamines prepared by reacting (a) an epihalohydrin oligomer or a mixture of an epihalohydrin oligomer and a chlorohydrin ether-terminated polyol and (b) a primary amine. These resulting linear amines may then be further reacted with primary, secondary or tertiary amines which replace the haloalkyl groups in the polyamine to provide further new polyamines.

In practicing the present invention, the halohydrin oligomer, preferably, comprises a polymeric epihalohydrin and, specifically, a polymer of epichlorohydrin.

The polyol which may be used herein is, generally, an alkoxylated polyhydroxyl compound.

Any primary amine can be used with efficacy herein.

The resulting polyamines can be characterized by the formula:

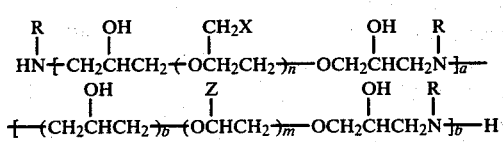

wherein:
R is either C$_1$ to C$_4$ alkyl group, 2-hydroxyethyl, or 2-hydroxypropyl,
X is a halogen atom
Z is either hydrogen, methyl or ethyl,
n is a whole number ranging from 2 to 30
m is an integer from 2 to about 100
a is a value from about 0 to about 20
b is a value from 0 to about 20 and ordinarily is no greater than A.

In those instances where b equals 0, the polyamine is a derivative of the formula:

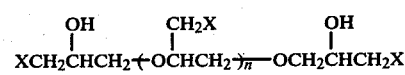

where X is the same as defined above.

Where b is greater than 0, the polyamine is a derivative of polyepichlorohydrin and a chlorhydrin terminated polyether of the formula:

wherein Z and M have the same meaning as given above.

The reaction between the epihalohydrin terminated polyether and amine proceeds at a temperature ranging from about 25° C. to about 150° C. for a period ranging from about 0.5 to about ten hours.

The polyamines hereof may be further reacted with primary, secondary or tertiary amines to replace the haloalkyl groups of the polyamines to provide, yet, further polyamines. These further polyamines may then be used to prepare paper additives and the like.

For a more complete understanding of the present invention reference is made to the following detailed description and accompanying examples.

DESCRIPTION OF THE PREFERRED EMBODIMENT

In accordance with the present invention, linear polyamines are provided which correspond to the formula:

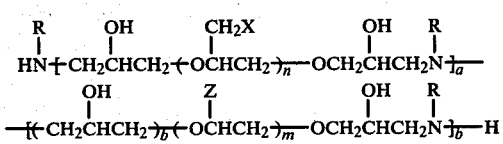

wherein:
R is a C$_1$ to C$_4$ alkyl radical, 2-hydroxyethyl or 2-hydroxypropyl,
X is halogen;
Z is hydrogen, methyl or ethyl;
n is a whole number ranging from 2 to 30;
m is an integer ranging from 2 to about 100;
a is a value ranging from about 0 to about 20;
b is a value ranging from 0 to about 20 and, preferably, is less than or equal to a.

The products hereof are prepared by reacting (a) an epihalohydrin oligomer or a mixture of an epihalohydrin oligomer and a chlorohydrin-terminated ether polyol of a polyoxyalkylene glycol with (b) a primary amine.

In the above formula, when b is 0, the polyamine is a derivative of the epihalohydrin oligomer, alone, having the postulated formula:

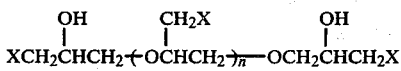

When b is greater than 0 then the polyamine is a derivative of the epihalohydrin oligomer and halohydrin-terminated polyether having the formula:

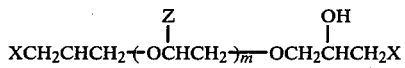

The polyamines hereof can be further reacted with primary, secondary, or tertiary mono- or polyamines. Such further reaction replaces the halogen of the haloalkyl groups of the original polyamines with further amino-groups.

The present invention is based upon the fact that halohydrin oligomers or active hydrogen derivatives thereof contain two kinds of halogen substituents. First, there are highly reactive terminal halohydrin halogen atoms. Secondly, there are pendant haloalkyl halogen atoms which are of lower reactivity with nucleophilic reagents, such as amines, than the terminal halogen atoms. By proper control of the reaction conditions, the above-defined linear polyamines can be obtained.

In reacting the ingredients, the control is achieved through amounts of reactants, reaction times and temperatures. Generally, the reaction proceeds at a temperature ranging from about 25° C. to about 130° C. for a period of time ranging from about 0.5 to ten hours. Generally, the reactants are employed in a molar ratio of amine to halohydrin or halohydrin and polyether ranging from about 1:1 to about 5:1. Preferably, the reaction proceeds at a temperature of from about 30° C. to about 130° C. for a period of from about 0.5 to 5 hours. Preferably, a molar ratio of amine to halohydrin or halohydrin and polyether mixture, of from about 1:1 to about 4:1 is employed.

The halohydrin oligomers used herein are, preferably, epihalohydrin polymers derived from monomers of the formula:

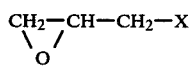

where X is Cl, Br, or I and preferably Cl. Other useful halohydrin oligomers can be based upon 4-halo-1,2-epoxy butane, 1-(1,3-dihaloisopropoxy)-2,3-epoxypropane; 4,4,4-trihalo-1,2-epoxy butane, 1-haloethyl glycidyl ether; 1,1,1-thihaloethyl glycidyl ether; 1,2-epoxy-2-methyl-4,6,6,6-tetrahalohexane; and the like. As noted, the preferred oligomers and derived from the epihalohydrin monomer and, in particular, epichlorohydrin.

The polyepichlorohydrins contemplated for use herein, generally, have from about two to about thirty chlorohydrin units in the polymer.

The halohydrin-terminated polyethers used herein are, generally, polyoxyalkylene polyether polyols that have been reacted with epihalohydrins to provide halohydrin-terminated polyethers. They are, preferably, of the formula:

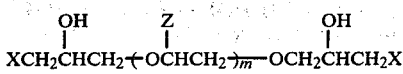

where X is halogen, m is an integer from about 2 to about 100 and Z is, preferably, hydrogen, methyl or ethyl.

Conventionally, these products are prepared by reacting a halohydrin with a polyether polyol. Generally, the polyether polyols, as contemplated for use herein, comprise an alkylene oxide adduct of a polyhydric alcohol. Examples of such compounds include the ethylene oxide and/or propylene oxide adducts of polyhydroxy compounds, such as glycols, triols, tetrols and the like.

Representive polyhydroxy compounds include ethylene glycol, propylene glycol, glycerol, trimethylopropane, erythritol, penetraerythritol, and the like as well as mixtures thereof. The compounds being well documented in the art.

Other useful oxides include 1,2-butylene oxide; 2,3-butylene oxide as well as other oxirane compounds. Such compounds are well known to the skilled artisan.

In practicing the present invention the preferred alkylene oxides are ethylene oxide and propylene oxide.

Where used, any desired proportional mixture of oligomer and polyether can be used. However, it is contemplated that no greater than a 1:1 molar ratio of oligomer to polyether be used. Yet, 100% of polyethers can be the reactant, if desired.

As heretofore noted, the present polyamines are prepared by reacting the oligomer or oligomer and polyether mixture with a primary amine. Any primary amine can be utilized to prepare the polyamines hereof. Thus, linear or branched alkyl amines having one reactive hydrogen site attached to the nitrogen group can be used. Although any length alkyl chain can be used, preferably, the alkyl amine is a $C_1$ to $C_4$ alkyl amine, such as, methyl amine, ethyl amine, n-propyl amine, n-butyl amine, i-propyl amine and the like can be used herein.

Substituted amines can be used herein as long as the substituents are not reactive with the chlorine atoms of the oligomer and/or polyether.

In practicing the present invention, the preferred amine is isopropylamine.

The polyamines hereof, which are coupled polymers, can be used directly such as a flame retardant, curing agent, crosslinking agent or the like. However, the primary utility of the present polyamines is derived from the subsequent or further reaction thereof with either primary, secondary or tertiary amines. Such further reaction replaces the haloalkyl group halogen atom with an amine group to provide a highly functional intermediate useful for preparing paper additives such as drainage aids; wet and dry strength additives, and the like. Other uses are those conventionally denoted for polyamines. Useful primary, secondary and tertiary reactants include mono- and polyamines well-known to the skilled artisan.

For a more complete understanding of the present invention reference is made to the following examples thereof. In the examples, which are illustrative and not limitative of the invention, all parts are by weight absent contrary indications.

EXAMPLE I

This example represents the preparation of a polyamine in accordance herewith from a epihalohydrin polyether.

Into a reaction vessel equipped with reflux condenser, heating means, agitation means, addition funnel and thermometer was charged six hundred and seventy parts (1 mole) of a halohydrin adduct of an alkoxylated polyhydroxy compound. The adduct consisted essentially of an epichlorohydrin adduct of a propoxylated propylene glycol having a molecular weight of about 400. Under a nitrogen blanket, the polyether was heated to 30° C. and maintained thereto while two hundred and thirty-six parts (4 moles) of isopropylamine was added thereto over a minute period. The mixture was heated, with stirring, to 60° C. and maintained thereat to effectuate reaction. Some amine was removed to eliminate excess. After the reaction was completed one hundred and sixty parts (2 moles) of 50% NaOH was added to the vessel to neutralize the amine hydrochloride. Excess amine was stripped off at 112° C. and 4 torr. The product was taken up in methanol and sodium chloride was filtered off, followed by stripping off of methanol. A yield of 659.4 parts of a viscous product was obtained. The product had a 3.5% amino nitrogen content corresponding to an 82.5% conversion of chlorohydrin group.

EXAMPLE II

Using equipment similar to that described in Example I, under a nitrogen blanket 1,435 parts (2.5 moles) of hexaepichlorohydrin was charged to the vessel and heated to 60° C. With stirring and maintenance of the blanket 295 parts (5 moles) of isopropylamine was added thereto. During the addition, which lasted fifty-five minutes, the temperature was maintained at 60° C.

After the addition was completed, the reaction temperature was maintained thereat for thirty-five minutes. Then, the temperature was raised to 116° C. at which an exotherm occurred raising the temperature in the vessel to 128° C. A cooling bath was applied to reduce the temperature. After an additional seventy-five minutes reaction time at a temperature of between 107° to 125° C. reflux subsided. Volatiles were, then, stripped up to 128° C. at 4 torr. Six parts of volatiles were removed and 1,720 parts of a viscous, clear amber product were recovered.

EXAMPLE III

Into a three-liter flash equipped with agitation means, reflux condenser, addition funnels, heating means and thermometer was charged 1,435 parts (2.5 moles) of hexaepichlorohydrin. The hexaepichlorohydrin was heated to 60° C. and 147.5 parts (2.5 moles) of isopropylamine was added thereto over a seventy-six minute period.

After the addition was completed, the reactants were further reacted at 60° C. for an additional forty-five minutes while agitation was maintained.

After the reaction was completed, a pH meter was placed in the flask and 800 parts of 25% NaOH (5 moles) was added thereto over a two hundred and five minute period. The initial pH was 6.74 and the final pH was 9.55.

Twenty parts of water was then added to the vessel to promote layer separation and after standing for fifteen minutes the upper aqueous layer was decanted. The crude product was washed with 2,210 parts of water. The crude wet product, which yielded 2,502 parts thereof, was stripped up to a temperature of 111° C. at 4 ml. A yield of 1427 parts of a light amber viscous product was, thus, obtained.

EXAMPLE IV

This example illustrates the utility of the present polyamines as well as the further reaction thereof with a polyamine.

Into a one-liter flask equipped with heating means, agitation means, thermometer and additional funnel was added 252 parts (4.2 moles) of ethylene diamine. The diamine was heated to 118° C. and maintained thereat. At a reaction temperature ranging between 116° C. and 130° C. was added 170 parts of the polyamine of Example II hereof. The addition took place over a 175 minute period. The polyamide had previously been heated to 80° C. to reduce its viscosity.

After the addition was completed, the reactants were stirred for an additional hour at the reaction temperature. After standing for about fourteen hours, the product was stripped up to 133° C. at 5 torr. A yield of 180 parts of distillate was recovered. Thus, a yield of 242 parts of stripped product was obtained. The stripped product was diluted with 161 parts of water to provide 403 parts of 60% polyamine in the hydrochloride form.

Into a one-liter flask was combined 134 parts of the hydrochloride solution, 94 parts of water and 40 parts of 50% NaOH. These ingredients were then heated to 98° to 99° C. in the flask. Then, 151 parts of a 30% solution of a 670 molecular weight epichlorohydrin adduct of a 400 molecular weight propoxylated propylene glycol polyol was added to the flask at 100° C. over a 160 minute period. The addition was halted when a "near-gel" state was reached.

The resulting product had a viscosity, as measured by a No. 4 Ford cup at 250° C., of 57 seconds. The product evidenced superior properties when evaluated as a paper pulp drainage aid using the Canadian Freeness drainage test.

Having, thus, described the invention what is claimed is:

1. A substantially linear polyamine, corresponding to the formula:

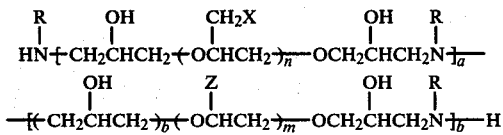

wherein R is either $C_1$ to $C_4$ alkyl group, 2-hydroxyethyl—or 2-hydroxypropyl, X is halogen, Z is either hydrogen, methyl or ethyl, n is a whole number ranging from 2 to 30, m is an integer from 2 to about 100, a is a value from about 0 to about 20, b is a value from about 0 to 20, the polyamine comprising the reaction product of (a) an epihalohydrin oligomer or a mixture of an epihalohydrin oligomer and a halohydrin-terminated derivative of a polyol and (b) a primary amine.

2. The polyamine of claim 1 wherein:
 b is no greater than a.

3. The polyamine of claim 1 wherein:
 x is chlorine.

4. The polyamine of claim 1 wherein:

the reactants are present in a respective molar ratio of from about 1:1 to about 1:5.

5. The polyamine of claim 1 wherein:
the reaction proceeds at a temperature of from about 30° C. to about 130° C. for a period of from about 0.5 to about 5.0 hours.

6. The polyamine of claim 1 wherein:
(a) is an epichlorohydrin oligomer and
(b) is an alkyl amine having from 1 to 4 carbon atoms.

7. The polyamine of claim 6 wherein:
the amine is isopropylamine.

8. The polyamine of claim 1 wherein:
the oligomer and polyol are employed in a molar ratio of about 1:1.

9. The polyamine of claim 1 wherein:
the polyol comprises the reaction product of a polyoxyalkylene polyether polyol and an epihalohydrin.

10. A method for forming a polyfunctional polyamine, comprising:
reacting an amine selected from the group consisting of primary, secondary, tertiary mono- or polyamine and mixtures thereof with the polyamine of claim 1.

11. The polyamine of claim 1 wherein the polyamine is prepared from the reaction of (a) the mixture of an epihalohydrin oligomer and a halohydrin-terminated derivative of a polyol and (b) a primary amine.

12. The polyamine of claim 11 wherein the polyol is a polyoxyalkylene glycol.

13. The polyamine of claim 11 wherein the reaction proceeds at a temperature of from about 30° C. to about 130° C. for about 0.5 to about 5.0 hours.

* * * * *